United States Patent
Stegmiller et al.

(10) Patent No.: US 12,415,602 B2
(45) Date of Patent: Sep. 16, 2025

(54) SOLENOID/MAGNETIC HOLD BRAKE WITH POWER OFF MAGNET HOLD FUNCTION

(71) Applicant: Goodrich Corporation, Charlotte, NC (US)

(72) Inventors: Wesley K. Stegmiller, Jamestown, ND (US); Wallace H. Larson, Jamestown, ND (US); Scott P. Harms, Ypsilanti, ND (US)

(73) Assignee: Goodrich Corporation, Charlotte, NC (US)

( * ) Notice: Subject to any disclaimer, the term of this patent is extended or adjusted under 35 U.S.C. 154(b) by 194 days.

(21) Appl. No.: 17/887,355

(22) Filed: Aug. 12, 2022

(65) Prior Publication Data
US 2024/0051663 A1    Feb. 15, 2024

(51) Int. Cl.
| | |
|---|---|
| *B64D 9/00* | (2006.01) |
| *B65G 13/02* | (2006.01) |
| *B65G 13/075* | (2006.01) |
| *F16D 55/02* | (2006.01) |
| *F16D 63/00* | (2006.01) |
| *F16D 65/18* | (2006.01) |
| *F16D 121/20* | (2012.01) |

(52) U.S. Cl.
CPC .............. *B64D 9/00* (2013.01); *B65G 13/02* (2013.01); *B65G 13/075* (2013.01); *F16D 55/02* (2013.01); *F16D 63/002* (2013.01); *F16D 65/186* (2013.01); *B64D 2009/006* (2013.01); *F16D 2121/20* (2013.01)

(58) Field of Classification Search
CPC .... B64D 9/00; B64D 2009/006; B65G 13/02; B65G 13/075; F16D 55/02; F16D 63/002; F16D 65/186; F16D 2121/20
See application file for complete search history.

(56) References Cited

U.S. PATENT DOCUMENTS

| | | | |
|---|---|---|---|
| 5,121,018 A * | 6/1992 | Oldakowski | H02K 7/1025 188/161 |
| 5,183,150 A | 2/1993 | Chary et al. | |
| 7,021,456 B2 | 4/2006 | Haan et al. | |
| 9,908,706 B1 * | 3/2018 | Ribarov | B65G 13/06 |
| 10,173,841 B1 * | 1/2019 | Ramalingam | H02K 11/27 |

(Continued)

FOREIGN PATENT DOCUMENTS

| | | | | |
|---|---|---|---|---|
| EP | 1224135 B1 * | 12/2003 | | B64D 9/00 |
| WO | WO-2011032641 A1 * | 3/2011 | | B64D 9/00 |

OTHER PUBLICATIONS

European Patent Office, European Search Report dated Jan. 2, 2024 in Application No. 23185396.1.

*Primary Examiner* — Gene O Crawford
*Assistant Examiner* — Abby A Jorgensen
(74) *Attorney, Agent, or Firm* — SNELL & WILMER L.L.P.

(57) ABSTRACT

A power drive unit (PDU) having a magnetic hold brake for use in an aircraft is disclosed herein. The PDU includes a wheel configured to convey cargo through a portion of the aircraft, a motor coupled to the wheel, a brake disk, a solenoid configured to apply a first force to move the brake disk in a first direction to resist rotation of the motor, wherein the solenoid is further configured to apply a second force to move the brake disk in a second direction opposite the first direction to allow the motor to rotate, and a magnet configured to apply a third force to the brake disk, the third force being in the first direction to apply a drag force to the motor.

16 Claims, 7 Drawing Sheets

(56) References Cited

U.S. PATENT DOCUMENTS

| | | | |
|---|---|---|---|
| 10,995,808 B1* | 5/2021 | Larson | F16D 65/183 |
| 11,053,078 B1* | 7/2021 | Stegmiller | B65G 13/00 |
| 2002/0104734 A1* | 8/2002 | Roberts | B65G 13/075 |
| | | | 193/35 A |
| 2017/0015503 A1* | 1/2017 | Harms | H02K 26/00 |
| 2017/0327315 A1* | 11/2017 | Larson | B60B 33/0049 |
| 2019/0009881 A1* | 1/2019 | Harms | B64C 1/20 |
| 2020/0331610 A1* | 10/2020 | Kish | B64C 19/00 |
| 2021/0261342 A1 | 8/2021 | Gopan et al. | |

* cited by examiner

SOLENOID/MAGNETIC HOLD BRAKE WITH POWER OFF MAGNET HOLD FUNCTION

FIELD

The present disclosure generally relates cargo loading systems for aircraft and, more specifically, to a power drive unit designed to provide a magnetic hold braking function.

BACKGROUND

Aircraft may transport at least one of passengers or cargo. Many aircraft thus have at least one cargo bay designed to receive cargo. Such cargo bays include cargo loading systems that include rollers located on a floor of the cargo bay along with power drive units (PDUs) that provide propulsion to drive a unit load device (ULD, cargo) through the cargo bay. Occasionally, power may be disturbed during loading of a cargo bay. In such situations, the PDU may either operate in a fully braked state in which the ULD cannot be manually pushed off the PDU or an open state in which the ULD may freely roll across the PDU or in a drag state where a ULD may be manually pushed over the PDU.

SUMMARY

A power drive unit (PDU) having a magnetic hold brake for use in an aircraft is disclosed herein. The PDU includes a wheel configured to convey cargo through a portion of the aircraft, a motor coupled to the wheel, a brake disk, a solenoid configured to apply a first force to move the brake disk in a first direction to resist rotation of the motor, wherein the solenoid is further configured to apply a second force to move the brake disk in a second direction opposite the first direction to allow the motor to rotate, and a magnet configured to apply a third force to the brake disk, the third force being in the first direction to apply a drag force to the motor.

In various embodiments, the solenoid applies the first force in response to a first current having a first polarity and wherein the solenoid applies the second force in response to a second current having a second polarity that is opposite the first polarity. In various embodiments, the PDU further includes a spring configured to apply a fourth force to the brake disk, the fourth force being in the second direction, wherein the spring assists the solenoid in moving the brake disk in the second direction. In various embodiments, the solenoid is positioned about an axis of rotation of the motor and the spring is located radially inward from the solenoid.

In various embodiments, the PDU further includes a motor shaft coupled to the motor and the wheel to transfer torque from the motor to the wheel, wherein the motor shaft is further coupled to the brake disk. In various embodiments, the solenoid is positioned about an axis of rotation of the motor shaft. In various embodiments, the drag force is sufficient to resist rotation of the motor shaft. In various embodiments, the solenoid further includes a solenoid coil and a solenoid housing, the solenoid coil being located in the solenoid housing. In various embodiments, the magnet is disposed around an outer circumference of the solenoid.

Also disclosed herein is a magnetic hold brake. The magnetic hold brake includes a brake housing, a brake disk, a solenoid disposed within the brake housing, the solenoid configured to apply a first force to move the brake disk in a first direction to a first position, and a magnet configured to apply a second force to the brake disk to hold the brake disk in the first position.

In various embodiments, the solenoid is configured to apply the first force in response to a first current having a first polarity. In various embodiments, the solenoid is configured to apply a third force allowing the brake disk to move in a second direction to a second position in response to a second current having a second polarity that is opposite the first polarity, the second direction being opposite the first direction. In various embodiments, the magnetic hold brake further includes a hole extending through the solenoid, the brake housing, and the brake disk, and a spring a spring disposed within the hole and configured to apply a fourth force to move the brake disk in the second direction to a third position.

In various embodiments, the solenoid further includes a solenoid coil and a solenoid housing, the solenoid coil and the spring being disposed within the solenoid housing. In various embodiments, the hole is configured to receive a motor shaft of a motor and the magnetic hold brake is configured to resist rotation of the motor shaft. In various embodiments, the magnet is disposed around an outer circumference of the solenoid.

Also disclosed herein is a power drive unit (PDU) having a magnetic hold brake for use in an aircraft. The PDU includes a wheel configured to convey cargo through a portion of the aircraft, a motor configured to generate torque, a gearbox coupled to the wheel, a motor shaft coupled to the motor and the gear box to transfer torque from the motor to the gearbox, a brake disk, a solenoid coupled to the motor shaft and the brake disk and configured to apply a first force to move the brake disk in a first direction to a braking position in response to a first condition, a spring disposed in the solenoid and configured to apply a second force in a second direction to the brake disk, the second direction being opposite the first direction, and a magnet disposed around the solenoid and configured to apply a third force in the first direction to the brake disk.

In various embodiments, the first condition is a first electric current having a first polarity. In various embodiments, the solenoid is further configured to apply a fourth force to move the brake disk in the second direction in response a second electric current having a second polarity, the second polarity being opposite the first polarity. In various embodiments, the first force moves the brake disk to a first position and wherein the third force is sufficient to hold the brake disk in the first position.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
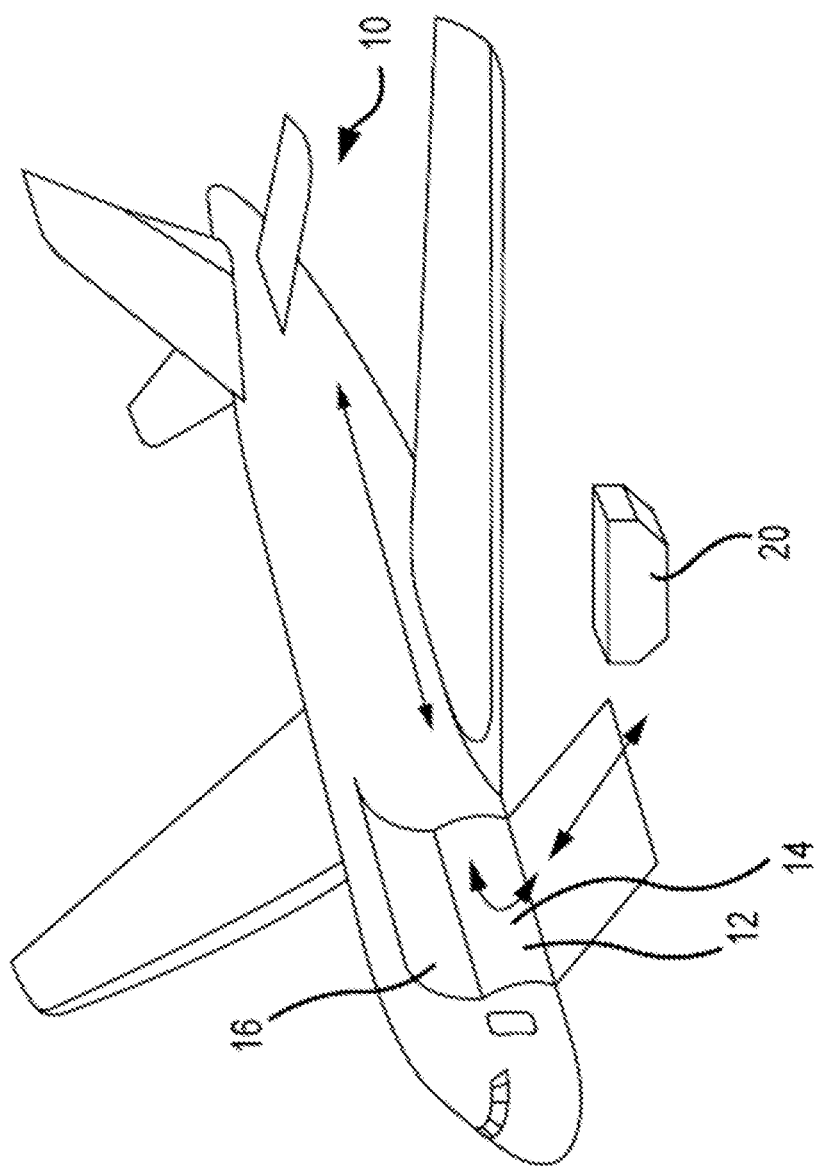
FIGS. 1A and 1B illustrate a schematic of an aircraft being loaded and a portion of a cargo handling system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a power drive unit (PDU) for use in a cargo hold area. The PDU includes one or more tires, a motor, and a magnetic hold brake. In various embodiments, the one or more tires are coupled to the motor, such as by a motor shaft of the motor, and provide motive force for moving cargo (e.g., unit load devices (ULD)) within the cargo hold area. In various embodiments, the magnetic hold brake is connected to the motor (e.g., connected to the motor shaft) and provides a braking force for the motor and the one or more tires. In various embodiments, the magnetic hold brake includes three states: brake applied, magnetic lock, and brake released. The braking functionality of the PDU may provide protection for the cargo area, the cargo, and workers from impacts during loading and unloading operations.

The magnetic hold brake includes a solenoid, an optional spring, and a magnet. In various embodiments, each of the solenoid, the optional spring, and the magnet may be disposed around the motor shaft of the PDU motor. In various embodiments, the magnetic hold brake may be connected to a disk brake and further include a friction material located between the disk brake and the solenoid, the optional spring, and the magnet. In various embodiments, the optional spring may be biased to push the brake disk away from the friction material, allowing the motor shaft, and by extension the one or more tires, to rotate with little to no braking.

In various embodiments, the magnetic hold brake includes a first state, a second state, and a third state. The first state may be a brake applied state, the second state may be a magnetic lock state, and the third state may be a brake release state. In various embodiments, in the first state, an electric current having a first polarity is applied to the solenoid to activate the solenoid. The solenoid generates a magnetic flux in response to the being activated and the magnetic flux attracts the disk brake to the solenoid. In various embodiments, this provides a braking force as the disk brake is pulled (e.g., forced) against the friction material.

In various embodiments, in the second state, the electric current is removed from the solenoid, deactivating the solenoid. The magnet holds the disk brake against the friction material, providing a braking force. In various embodiments, the braking force of the second state is less than the braking force of the first state. In various embodiments, this may allow the one or more tires to rotate, allowing cargo to be moved manually, when there is no power provided to the PDU. In various embodiments, the force used to rotate the one or more tires in the second state may be greater than the force used to rotate the one or more tires in the third state. In various embodiments, the magnetic lock of the magnetic hold brake provides similar functionality to currently used braking rollers, allowing for the removal of braking rollers from the cargo area.

In various embodiments, in the third state, an electric current having a second polarity that is opposite the first polarity is applied to the solenoid to activate the solenoid. The solenoid generates a magnetic flux in response to being activated and the magnetic flux of the solenoid counterbalances the magnet (e.g., zero flux) to reduce the force on the friction material. This allows the motor shaft and the one or more tires to rotate with little to no braking force. In various embodiments, the optional spring may be used to completely release the brake disk from the friction material.

As can be seen, the magnetic hold brake as disclosed herein may provide improved braking and control of the PDU and the cargo being moved by the PDU. Furthermore, the magnetic hold brake as disclosed herein may reduce the number of parts used in the cargo area (e.g., remove braking rollers) as well as the number of parts used in the PDU brake. This may result is a cost, weight, and reliability savings.

Referring now to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
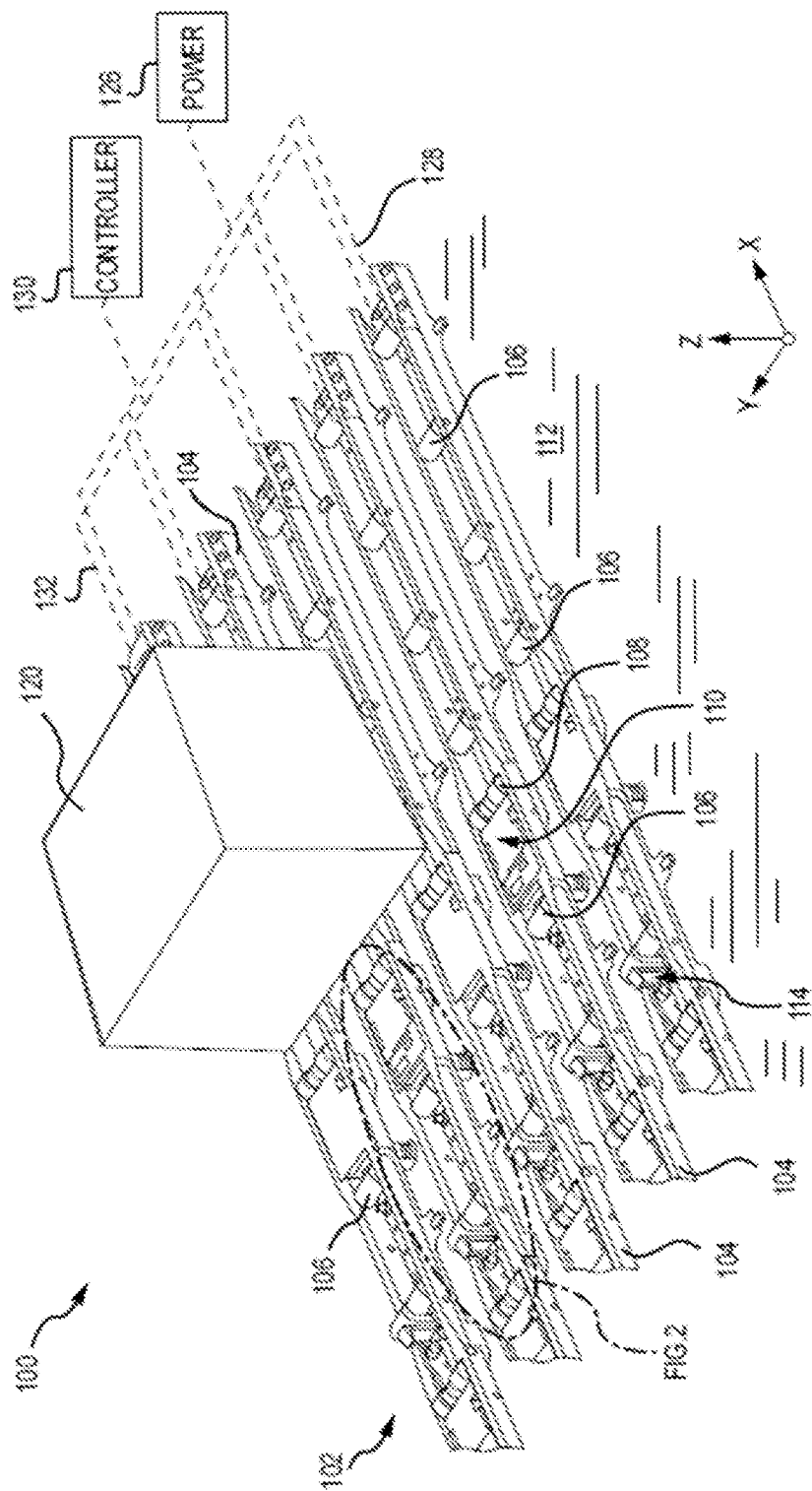

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by manual intervention, a motor driven actuator, or a bias member, thereby restraining or preventing the ULD 120 from translating in the opposite direction.

Figure 2:
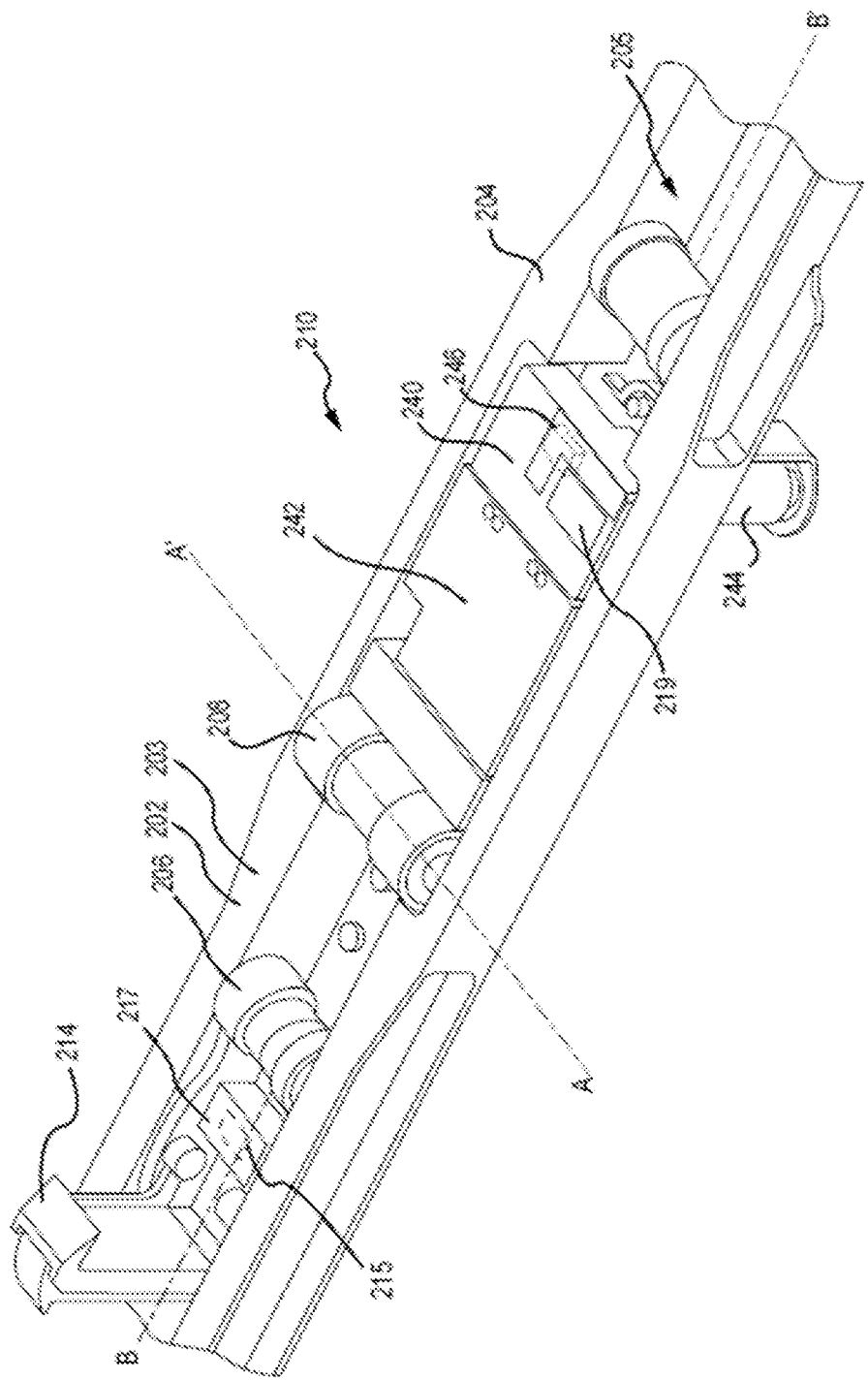
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 (e.g., in the z-direction) of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
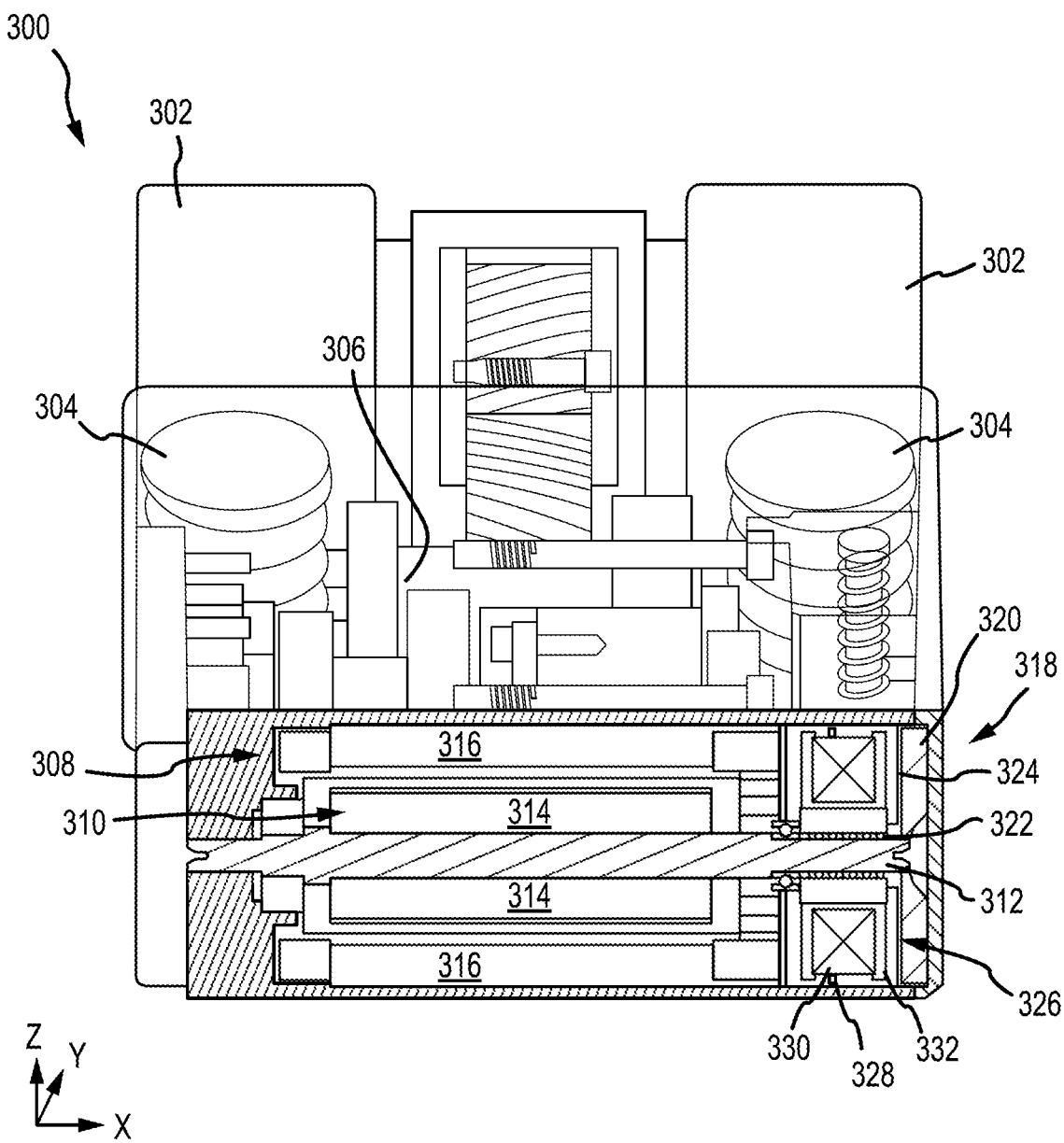
FIG. 3 illustrates a power drive unit, in accordance with various embodiments.

Referring now to FIG. 3, in accordance with various embodiments, a perspective view of components of a power drive unit (PDU) 300 is illustrated. PDU 300 includes tires 302, lift springs 304, a gearbox 306, and a motor assembly 308. Tires 302 are configured to engage cargo (e.g., ULD 120) to move the cargo (e.g., along the y-axis). Lift spring 304 are configured to aid in raising and lower PDU 300 (e.g., in the z-axis) so that tires 302 are able to engage the cargo (e.g., in a raised position) and disengage from the cargo (e.g., in a lowered position). Gearbox 306 includes one or more gears that transfer rotational movement from motor assembly 308 to tires 302 for moving the cargo.

Motor assembly 308 includes a motor 310, a motor shaft 312, one or more stators 314, one or more rotors 316, and a brake assembly 318. At least one of stator 314 or rotor 316 may include at least one magnet, and at least one of stator 314 or rotor 316 may include coils, or windings. In response to electricity being applied to stator 314 or rotor 316, a magnetic flux may be generated which causes the rotor 316 to rotate relative to the stator 314, thus generating torque. Motor shaft 312 may be rotatably coupled to rotor 316 and may rotate along with rotor 316. The torque generated by motor 310 may be transferred to motor shaft 312. Motor shaft 312 may be coupled to gearbox 306 that is configured to transfer rotational movement from motor shaft 312 to tires 302.

Brake assembly 318 includes a brake disk 320, an optional spring 322, a friction material 324, a solenoid 326, and a magnet 328. Solenoid 326 may include a solenoid coil 330 and a solenoid housing 332. In various embodiments, solenoid 326 may be located around an axis of rotation of motor shaft 312. Brake assembly 318 may function to hold PDU 300 in a brake position. More specifically, brake assembly 318 may function to hold tires 302 in a brake position, preventing rotation of tires 302.

In a first state, solenoid 326 activates brake disk 320 thereby applying a braking force to motor shaft 312, and by extension, tires 302. That is, in response to solenoid 326 being activated by a first polarity, a first magnetic flux may be generated in solenoid coil 330 which causes brake disk 320 to move toward solenoid 326 (e.g., in the negative x-direction), contacting friction material 324, and slowing the rotation of motor shaft 312.

In a second state, solenoid 326 is deactivated brake disk 320 is magnetically latched to brake assembly 318, and more specifically, to magnet 328. That is, in response to solenoid 326 being deactivated, brake disk 320 remains in contact with friction material 324 by magnetic force of magnet 328. The second state maintains a braking force on motor shaft 312, and thereby on tires 302, when power is removed from PDU 300. In various embodiments, the braking force of the second state is less than the braking force of the first state. In various embodiments, magnet 328 is a permanent magnet.

In a third state, solenoid 326 overcomes the magnetic force on brake disk 320 thereby releasing the braking force from motor shaft 312, and by extension, tires 302. That is, in response to solenoid 326 being activated by a second polarity that is opposite the first polarity, a second magnetic flux may be generated in solenoid coil 330 which cancels out magnetic attraction of powered off solenoid 326 on brake disk 320 allowing brake disk 320 to move away from solenoid 326 (e.g., in the x-direction) and further allowing motor shaft 312 to rotate. In various embodiments, optional spring 322 may assist solenoid 326 by repelling brake disk 320 to disengage brake disk 320 entirely from friction material 324.

Figure 4A:
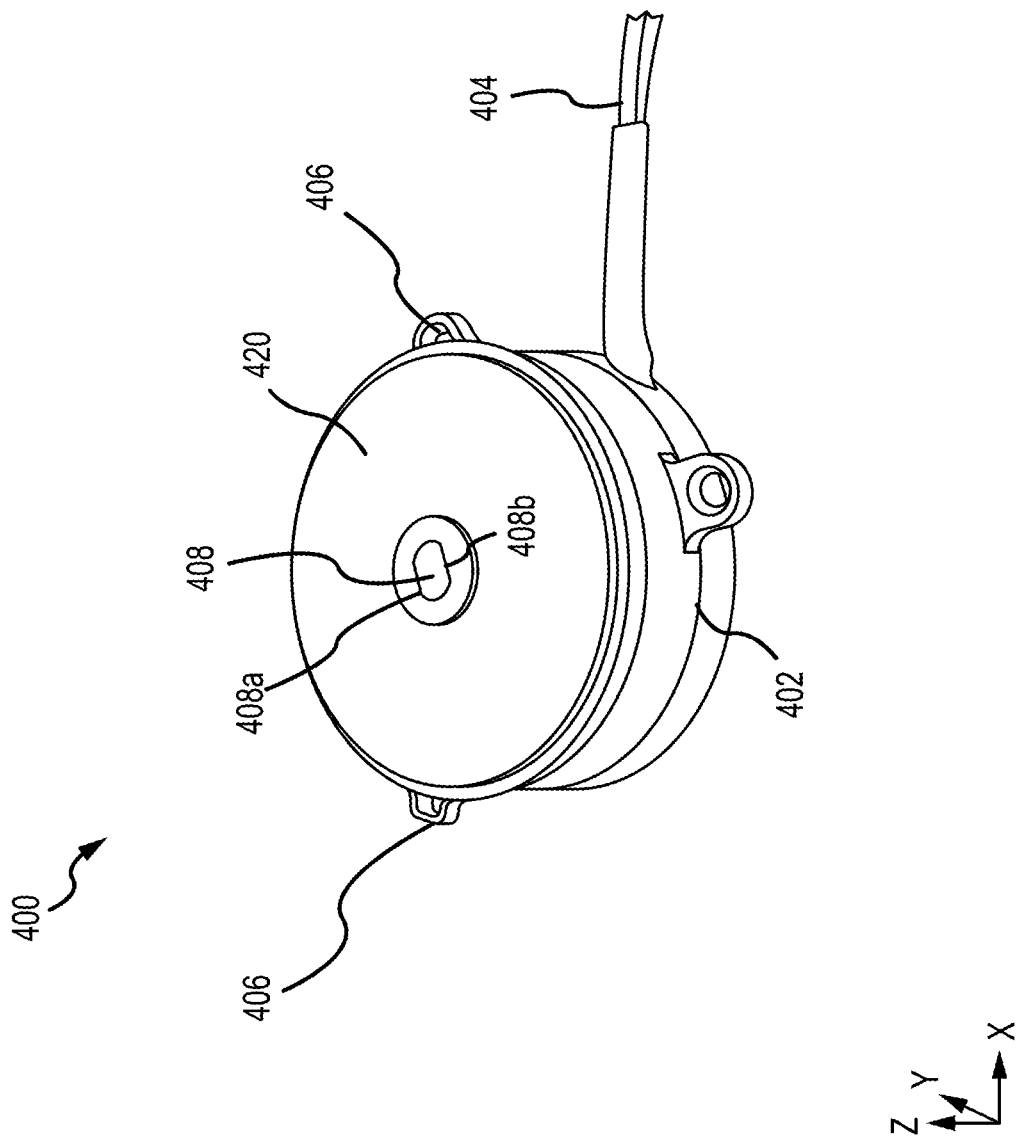
FIGS. 4A, 4B, and 4C illustrate a magnetic hold brake unit, in accordance with various embodiments.
Figure 4B:
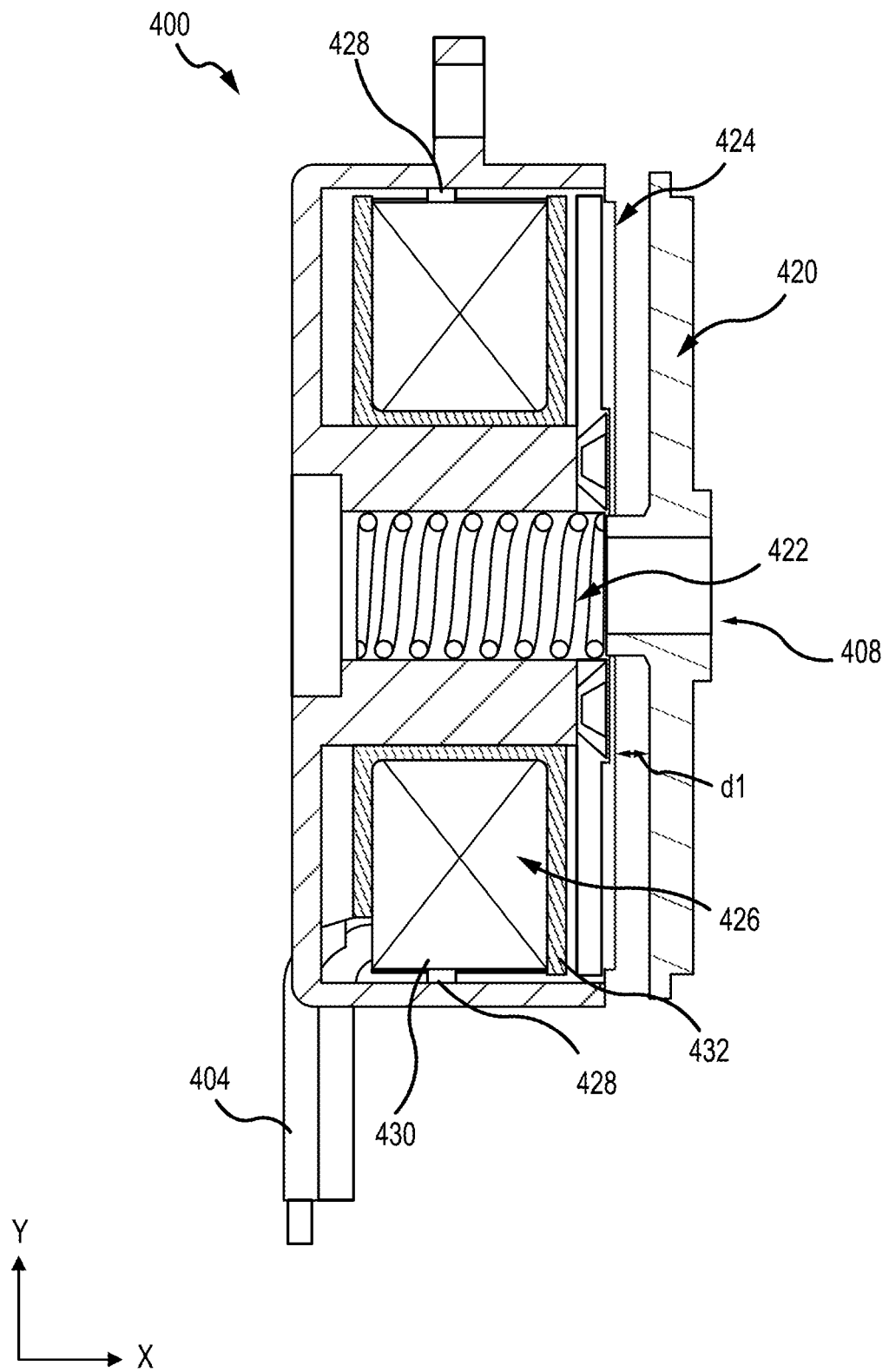
Figure 4C:
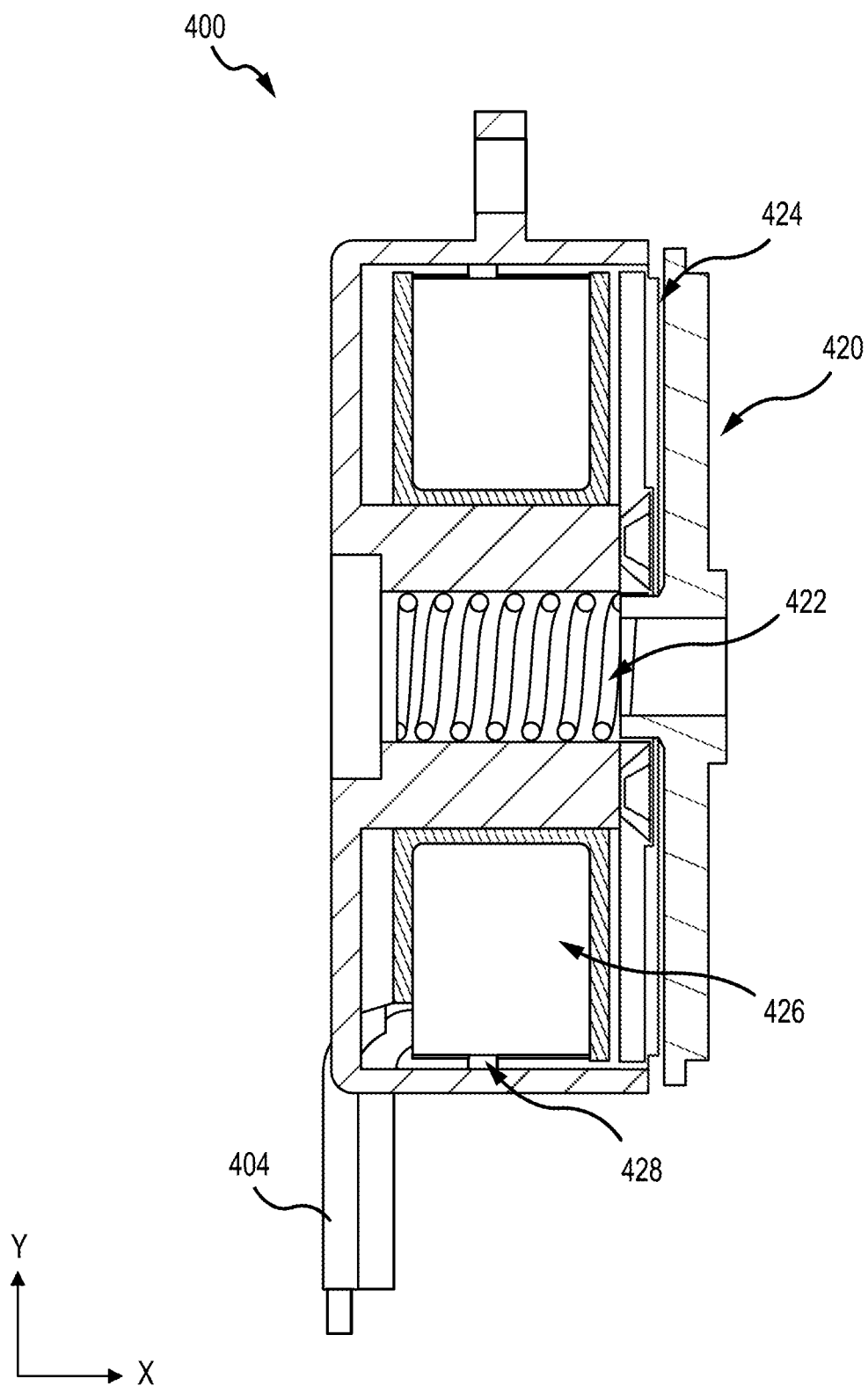

Referring now to FIGS. 4A-4C, in accordance with various embodiments, a magnetic hold brake 400 is illustrated. FIG. 4A illustrates a perspective view of magnetic hold brake 400. FIG. 4B illustrates a cross section view of magnetic hold brake 400 in a released position. FIG. 4C illustrates a cross section view of magnetic hold brake 400 in a braking position. Magnetic hold brake 400 includes a brake body 402, wires 404, mount holes 406, and a hole 408 for receiving motor shaft 312. Hole 408 includes a flat key 408a and a flat key 408b for engaging motor shaft 312 to prevent rotation of motor shaft 312 when a braking force is applied. In various embodiments, hole 408 may be circular, oval, square, or hexagonal, among other shapes. Mount holes 406 provide a secure location for mounting magnetic hold brake 400 in a power drive unit (PDU). In various embodiments, magnetic hold brake 400 may be a drop-in replacement for a brake system currently used in a PDU. Wires 404 provide an electric path for activating magnetic hold brake 400.

Magnetic hold brake 400 further includes a brake disk 420, an optional spring 422, a friction material 424, a solenoid 426, and a magnet 428. Solenoid 426 further includes solenoid coils 430 and a solenoid housing 432 where solenoid coils 430 are located in solenoid housing 432. In various embodiments, the components of magnetic hold brake 400 may be similar to the components of brake assembly 318. As illustrated in FIGS. 4B and 4C, hole 408 further extends through brake disk 420, optional spring 422, and solenoid 426. In various embodiments, optional spring 422 is biased to apply a force to move brake disk 420 away from solenoid 426 (e.g., in the x-direction). Brake disk 420 may be separated from friction material 424 by a distance d1, as illustrated in FIG. 4B. Distance d1 may be about 50 μm to about 250 μm, and more specifically, about 100 μm to about 200 μm. As illustrated in FIG. 4B, magnetic hold brake 400, and more specifically, brake disk 420, does not apply a braking force, allowing a motor shaft (e.g., motor shaft 312) to rotate.

Wires 404 provide electric current to solenoid 426. Solenoid 426 generates a first magnetic flux in response to a first current having a first polarity. The first magnetic flux attracts brake disk 420 to solenoid 426 (e.g., the negative x-direction) so that brake disk 420 contacts and engages friction material 424. That is, solenoid 426 applies a force (e.g., in the negative x-direction) to move brake disk 420 in a first direction to a braking position. This causes magnetic hold brake 400 to apply a braking force to the motor shaft, arresting rotation of the motor shaft and by extensions the tires 302 of PDU 300, for example. In various embodiments, the first current may be applied to solenoid 426 for a first period of time that is sufficient to stop the rotation of tires 302 and then may be removed. In various embodiments, the first period of time may be about 0.25 seconds to about 2 seconds, and more specifically about 0.75 seconds to about 1.5 seconds. In various embodiment, the first current may be applied to solenoid 426 indefinitely to prevent tires 302 from rotating.

In various embodiments, after the first period of time, the first current is removed from solenoid 426. The magnet flux generated by solenoid 426 stops in response to the first current being removed. Magnet 428 applies a sufficient force (e.g., in the negative-x direction) to hold brake disk 420 in the braking position. The force applied by magnet 428 (e.g., in the negative x-direction) is greater than the force applied by optional spring 422 (e.g., in the x-direction) but may be less than the force applied by activated solenoid 426 (e.g., in the negative x-direction). In this state, magnetic hold brake 400 operates in a drag mode which requires more force to rotate tires 302 than when tires 302 are freely rotating but less force than when a full braking force is applied. In various embodiments, magnet 428 is located around an outer circumference of solenoid 426. In various embodiments magnet 428 is chosen to be to apply a magnetic latching force strong enough to hold brake disk 420 is in the braking positing but not so strong that magnet 428 is able to move brake disk 420 to the braking position without solenoid 426.

In various embodiments, magnet 428 may be moved axially (e.g., in the x-axis) closer to brake disk 420 or further away from brake disk 420 than is illustrated in FIGS. 4B and 4C. In various embodiments, magnet 428 is a permanent magnet.

Solenoid 426 generates a second magnetic flux that is opposite the first magnetic flux in response to a second current having a second polarity that is opposite the first polarity. The second magnetic flux overcomes the magnetic flux of magnet brake disk 420 away from solenoid 426 (e.g., in the x-direction). That is, solenoid 426 applies a force (e.g., in the x-direction) to move brake disk 420 in a second direction to a rotating position. In various embodiments, optional spring 422 assists in repelling brake disk 420. While in the rotating position, motor shaft 312 and tires 302 may rotate with little to no braking force.

As described herein, magnetic hold brake 400 has three states of operation. In a first state of operation, brake disk 420 is electrically applied using solenoid 426 and magnetic hold brake 400 resists rotation of motor shaft 312. In a second state, brake disk 420 is magnetically latched by magnet 428 and magnetic hold brake 400 resists rotation of motor shaft 312. Magnetic hold brake 400 provides less resistance in the second state than in the first state. In a third state, brake disk 420 is electrically released using solenoid 426 and optional spring 422 and magnetic hold brake 400 allows motor shaft 312 to rotate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A power drive unit (PDU) having a magnetic hold brake for use in an aircraft, the PDU comprising:
   a wheel configured to convey cargo through a portion of the aircraft;
   a motor coupled to the wheel;
   a brake disk;
   a solenoid configured to apply a first force on the brake disk to move the brake disk in a first direction to resist rotation of the motor, wherein the solenoid is further configured to apply a second force on the brake disk to move the brake disk in a second direction opposite the first direction to allow the motor to rotate, wherein the solenoid applies the first force in response to a first current having a first polarity and wherein the solenoid applies the second force in response to a second current having a second polarity that is opposite the first polarity; and
   a magnet having the first polarity and configured to apply a third force on the brake disk, the third force being in the first direction to apply a drag force to the motor.

2. The PDU of claim 1, further comprising:

a spring configured to apply a fourth force to the brake disk, the fourth force being in the second direction, wherein the spring assists the solenoid in moving the brake disk in the second direction, and wherein, in response to the solenoid applying neither the first force nor the second force, the third force overcomes the fourth force.

3. The PDU of claim 2, wherein the solenoid is positioned about an axis of rotation of the motor and the spring is located radially inward from the solenoid.

4. The PDU of claim 1, further comprising:

a motor shaft coupled to the motor and the wheel to transfer torque from the motor to the wheel, wherein the motor shaft is further coupled to the brake disk.

5. The PDU of claim 4, wherein the solenoid is positioned about an axis of rotation of the motor shaft.

6. The PDU of claim 4, wherein the drag force is sufficient to resist rotation of the motor shaft.

7. The PDU of claim 1, wherein the solenoid further includes a solenoid coil and a solenoid housing, the solenoid coil being located in the solenoid housing.

8. The PDU of claim 1, wherein the magnet is disposed around an outer circumference of the solenoid.

9. A magnetic hold brake, comprising:

a brake housing;

a brake disk;

a solenoid disposed within the brake housing, the solenoid configured to apply a first force on the brake disk to move the brake disk in a first direction to a first position in response to a first current having a first polarity, the first position being a braking position; and a magnet having the first polarity and configured to apply a second force on the brake disk to hold the brake disk in the first position, wherein the solenoid is configured to apply a third force on the brake disk allowing the brake disk to move in a second direction to a second position in response to a second current having a second polarity that is opposite the first polarity, the second direction being opposite the first direction.

10. The magnetic hold brake of claim 9, further comprising:

a hole extending through the solenoid, the brake housing, and the brake disk; and a spring disposed within the hole and configured to apply a fourth force to move the brake disk in the second direction to a third position.

11. The magnetic hold brake of claim 10, wherein the solenoid further includes a solenoid coil and a solenoid housing, the solenoid coil and the spring being disposed within the solenoid housing.

12. The magnetic hold brake of claim 10, wherein the hole is configured to receive a motor shaft of a motor and the magnetic hold brake is configured to resist rotation of the motor shaft.

13. The magnetic hold brake of claim 9, wherein the magnet is disposed around an outer circumference of the solenoid.

14. A power drive unit (PDU) having a magnetic hold brake for use in an aircraft, the PDU comprising:

a wheel configured to convey cargo through a portion of the aircraft;

a motor configured to generate torque;

a gearbox coupled to the wheel;

a motor shaft coupled to the motor and the gear box to transfer torque from the motor to the gearbox;

a brake disk;

a solenoid coupled to the motor shaft and the brake disk and configured to apply a first force on the brake disk to move the brake disk in a first direction to a braking position in response to a first electric current having a first polarity;

a spring disposed in the solenoid and configured to apply a second force in a second direction on the brake disk, the second direction being opposite the first direction; and a magnet having the first polarity and disposed around the solenoid and configured to apply a third force in the first direction on the brake disk.

15. The PDU of claim 14, wherein the solenoid is further configured to apply a fourth force to move the brake disk in the second direction in response to a second electric current having a second polarity, the second polarity being opposite the first polarity.

16. The PDU of claim 15, wherein the first force moves the brake disk to a first position and wherein the third force is sufficient to hold the brake disk in the first position in response to the solenoid applying neither the first force nor the fourth force.

* * * * *